United States Patent
Guduru et al.

(10) Patent No.: US 12,375,953 B2
(45) Date of Patent: Jul. 29, 2025

(54) SYSTEMS AND METHODS FOR OBTAINING DATA FOR NETWORK ANALYTICS FROM A NON-3GPP INTERWORKING FUNCTION

(71) Applicant: Verizon Patent and Licensing Inc., Basking Ridge, NJ (US)

(72) Inventors: Vijayakrishna P. Guduru, Denville, NJ (US); Anthony Clay Reynolds, Rhome, TX (US); Raquel Morera Sempere, Weehawken, NJ (US); Sudhakar Reddy Patil, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 426 days.

(21) Appl. No.: 17/823,637

(22) Filed: Aug. 31, 2022

(65) Prior Publication Data

US 2024/0073715 A1    Feb. 29, 2024

(51) Int. Cl.
*H04W 24/08* (2009.01)
*H04W 24/10* (2009.01)
*H04W 84/04* (2009.01)

(52) U.S. Cl.
CPC ......... *H04W 24/08* (2013.01); *H04W 24/10* (2013.01); *H04W 84/042* (2013.01)

(58) Field of Classification Search
CPC ... H04W 24/08; H04W 24/10; H04W 84/042; H04W 84/04; H04W 48/18; H04W 84/00
USPC .................................................. 370/329
See application file for complete search history.

(56) References Cited

U.S. PATENT DOCUMENTS

| | | | |
|---|---|---|---|
| 2022/0240213 A1* | 7/2022 | Ly | H04W 60/02 |
| 2022/0272620 A1* | 8/2022 | Ninglekhu | H04W 40/02 |
| 2022/0386401 A1* | 12/2022 | Qiao | H04W 48/16 |
| 2023/0276344 A1* | 8/2023 | Dao | H04M 15/8016 370/329 |
| 2023/0300651 A1* | 9/2023 | Kim | H04W 24/02 370/252 |
| 2023/0422293 A1* | 12/2023 | Qiao | H04W 72/566 |
| 2024/0073996 A1* | 2/2024 | Chun | H04W 76/32 |
| 2024/0098470 A1* | 3/2024 | Kundu | G06T 1/20 |
| 2024/0235866 A1* | 7/2024 | Talebi Fard | H04W 4/02 |
| 2024/0323825 A1* | 9/2024 | Salkintzis | H04W 48/18 |
| 2024/0414633 A1* | 12/2024 | Chandramouli | H04W 36/14 |

OTHER PUBLICATIONS

"Architecture enhancements for 5G System (5GS) to support network data analytics services", 3GPP Ts 23.288 V16.3.0; Release 16 (Year: 2020).*

* cited by examiner

*Primary Examiner* — Mong-Thuy T Tran (57) ABSTRACT

A method may include providing a network data analytics function (NWDAF) in a network and providing, a non-third generation partnership project (3GPP) interworking function (N3IWF) in the network. The method may also include subscribing, by the N3IWF, to the NWDAF, and obtaining, by the NWDAF and from the N3IWF, data associated with processing performed by the N3IWF.

20 Claims, 5 Drawing Sheets

SYSTEMS AND METHODS FOR OBTAINING DATA FOR NETWORK ANALYTICS FROM A NON-3GPP INTERWORKING FUNCTION

BACKGROUND INFORMATION

In Fifth Generation (5G) networks, a Non-Third Generation Partnership Project (3GPP) InterWorking Function (N3IWF) acts as a gateway for a 5G core network (CN). For example, an N3IWF may support N2 and N3 interfaces for communication with elements/functions of the 5G CN. The N3IWF may also provide a secure connection for a user equipment (UE) device to access the 5G CN over a non-3GPP access network.

DETAILED DESCRIPTION OF EXAMPLE EMBODIMENTS

The following detailed description refers to the accompanying drawings. The same reference numbers in different drawings may identify the same or similar elements.

Implementations described herein provide for a network data analytics function (NWDAF) to obtain traffic information, event-related information and other information from an N3IWF. For example, when a service provider or operator deploys an N3IWF and an NWDAF in a core network, the N3IWF may subscribe to services provided by the NWDAF. The NWDAF may then collect traffic related information and event-related information from the N3IWF. In one implementation, the NWDAF may collect data and events on a per slice basis. The term "slice" or "network slice" as used herein refers to a logical network including a portion of a network (e.g., a portion of an access network and/or a portion of a core network) that provides telecommunication services and network capabilities that can vary from slice to slice. Each network slice may be associated with a different type of service having different characteristics and requirements (e.g., latency, jitter, bandwidth, etc.). A service provider may provision network slices for UE devices to provide network connectivity and data services to UE devices.

In an exemplary implementation, the NWDAF may collect data and events from the N3IWF using various slice information, such as network slice selection assistance information (NSSAI) information which identifies particular slices or a Single-NSSAI, which identifies a particular slice. The NSSAI may identify, for example, a low latency slice and/or a time sensitive network slice being employed in the network. The NWDAF may then collect data for each particular slice to ensure that the slice is meeting quality of service (QoS) requirements, service level agreements (SLAs) and/or other key performance indicators (KPIs) associated with the particular slice. The NWDAF may also detect abnormal behavior with respect to data obtained from the N3IWF.

Figure 1:
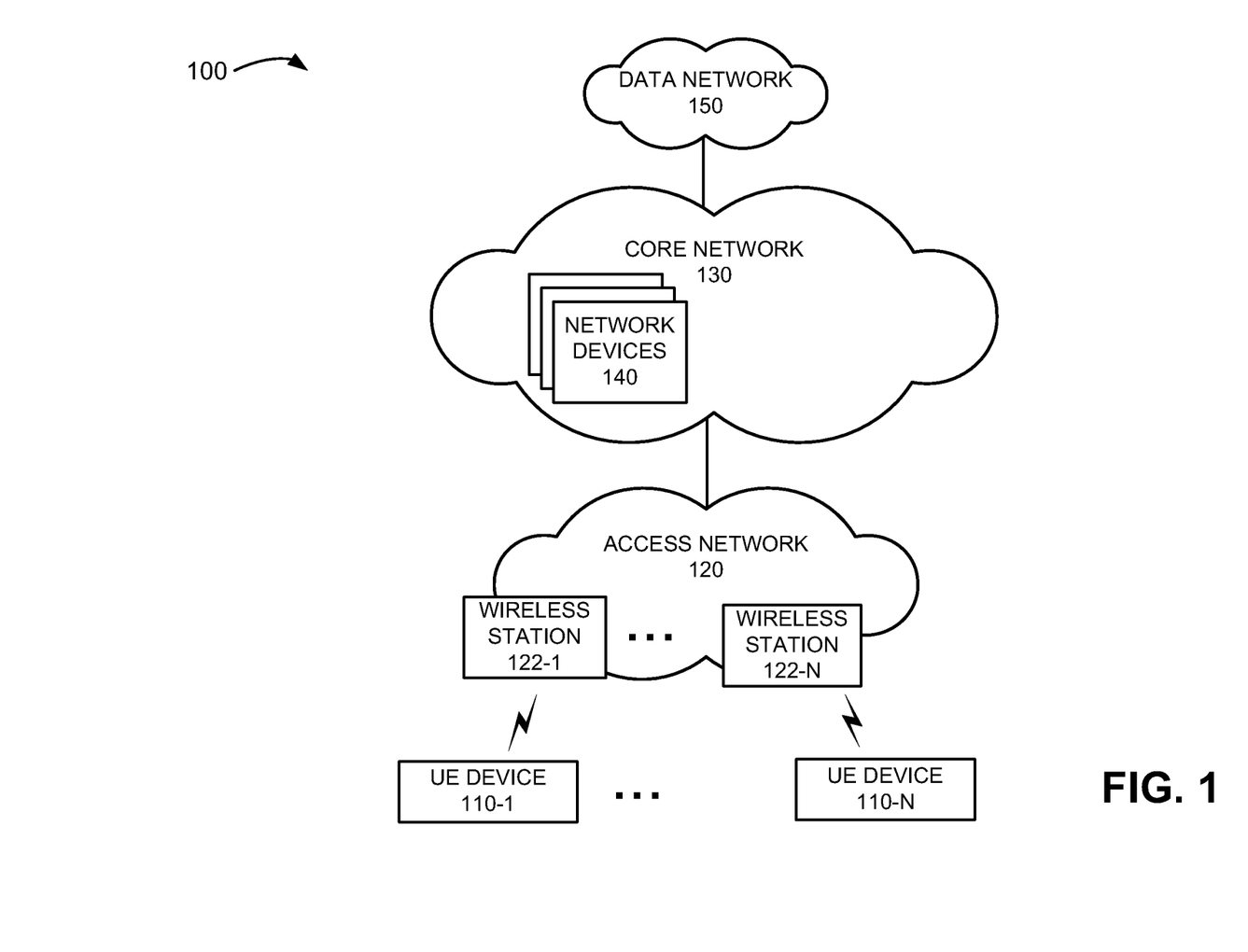
FIG. 1 illustrates an exemplary environment in which systems and methods described herein may be implemented.

FIG. 1 is a diagram illustrating an exemplary environment 100 in which systems and methods described herein may be implemented. Referring to FIG. 1, environment 100 includes user equipment (UE) device 110-1 through 110-N, access network 120, wireless stations 122-1 through 122-N, core network 130, network devices 140 and data network 150.

UE devices 110-1 through 110-N (referred to herein individually as UE device, UE 110 or user device 110, and collectively as UE devices, UEs 110 or user devices 110) may include any computing device, such as a personal computer (PC), a laptop computer, a server, a tablet computer, a notebook, a Chromebook®, a mobile device, such as wireless or cellular telephone device (e.g., a conventional cell phone with data processing capabilities), a smart phone, a personal digital assistant (PDA) that can include a radiotelephone, any type of mobile computer device or system, a game playing device, a music playing device, a home appliance device, a home monitoring device, a virtualized system, an assisted guided vehicle (AGV), an automated mobile robot (AMR), an industrial sensor, augmented reality (AR)/virtual reality (VR) equipment, a fixed wireless access (FWA) device, etc., that includes communication functionality. UE device 110-1 may connect to access network 120 via wireless station 122-1 and UE device 110-N may connect to access network 120 via wireless station 122-N. UE devices 110 may also connect to other devices in environment 100 via any conventional technique, such as wired, wireless, optical connections or a combination of these techniques. UE device 110 and the person associated with UE device 110 (e.g., the party holding or using UE device 110) may be referred to collectively as UE device or UE 110 in the description below.

Access network 120 may provide access to core network 130 for wireless devices, such as UE devices 110. Access network 120 may enable UE device 110 to connect to core network 130 for Internet access, non-Internet Protocol (IP) data delivery, cloud computing, mobile telephone service, Short Message Service (SMS) message service, Multimedia Message Service (MMS) message service, and/or other types of data services. Access network 120 may provide access to core network 130, a service or application layer network, a cloud network, a multi-access edge computing (MEC) network, a fog network, etc. Furthermore, access network 120 may enable a device in core network 130 to exchange data with UE device 110 using a non-IP data delivery method such as Data over Non-Access Stratum (DoNAS).

Access network 120 may also include a 5G access network or another advanced network, such as a Fourth Generation (4G) Long Term Evolution (LTE) access network. Additionally, access network 120 may include functionality such as the functionality of a millimeter (mm)Wave Radio Access Network (RAN). Access network 120 may also include: support for advanced or massive multiple-input and multiple-output (MIMO) antenna configurations (e.g., an 8×8 antenna configuration, a 16×16 antenna configuration, a 256×256 antenna configuration, etc.); support for cooperative MIMO (CO-MIMO) configurations; support for carrier aggregation; relay stations; Heterogeneous Networks (HetNets) of overlapping small cells and macrocells; Self-Organizing Network (SON) functionality; machine type communication (MTC) functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of 5G functionality.

Wireless stations 122 (referred to collectively as wireless stations 122 and individually as wireless station 122) may be included in access network 120. Each wireless station 122 may service a number of UE devices 110 and/or other user devices when the particular device is within radio frequency range of wireless station 122. In one implementation, wireless station 122 may include a 5G base station (e.g., a next generation NodeB (gNB)) that includes one or more radio frequency (RF) transceivers. For example, wireless station 122 may include three RF transceivers and each RF transceiver may service a 120 degree sector of a 360 degree field of view. Each RF transceiver may include or be coupled to an antenna array. The antenna array may include an array of controllable antenna elements configured to send and receive 5G new radio (NR) wireless signals via one or more antenna beams. In other implementations, wireless station 122 may also include a 4G base station (e.g., an evolved NodeB (eNodeB)) or a 6G base station that communicates wirelessly with UEs 110 located within the radio frequency range of wireless station 122.

Core network 130 may include one or more wired, wireless and/or optical networks that are capable of receiving and transmitting data, voice and/or video signals. In an exemplary implementation, core network 130 may be associated with a telecommunications service provider (e.g., a service provider providing cellular wireless communication services and wired communication services) and may manage communication sessions of UE devices 110 connecting to core network 130 via access network 120. Core network 130 may include one or multiple networks of different types and technologies. For example, core network 130 may be implemented to include a next generation core (NGC) network for a 5G network, an Evolved Packet Core (EPC) of an LTE or LTE Advanced network, a sixth generation (6G) network, and/or a legacy core network. Core network 130 may provide packet-switched services and wireless IP connectivity to various components in environment 100, such as UE devices 110, to provide, for example, data, voice, and/or multimedia services.

Core network 130 may include various network devices 140. Depending on the implementation, network devices 140 may include 5G core network components (e.g., a User Plane Function (UPF), an Access and Mobility Management Function (AMF), a Session Management Function (SMF), an N3IWF, an NWDAF, a Unified Data Management (UDM) function, a Unified Data Repository (UDR), a Policy Control Function (PCF), a Charging Function (CHF), etc.), 4G core network components (e.g., a Serving Gateway (SGW), a Packet data network Gateway (PGW), a Mobility Management Entity (MME), a Home Subscriber Server (HSS), a Policy Charging and Rules Function (PCRF), etc.), or another type of core network components (e.g., future 6G network components). In other implementation, network devices 140 may include combined 4G and 5G functionality, such as a session management function with PGW-control plane (SMF+PGW–C) and a user plane function with PGW-user plane (UPF+PGW–U).

Data network 150 may include, for example, a packet data network. In an exemplary implementation, UE device 110 may connect to data network 150 via core network 130. Data network 150 may also include and/or be connected to a local area network (LAN), a wide area network (WAN), a metropolitan area network (MAN), an autonomous system (AS) on the Internet, an optical network, a cable television network, a satellite network, a wireless network, an ad hoc network, a telephone network (e.g., the Public Switched Telephone Network (PSTN) or a cellular network), an intranet, or a combination of networks.

The exemplary configuration illustrated in FIG. 1 is provided for simplicity. It should be understood that a typical environment may include more or fewer devices than illustrated in FIG. 1. For example, environment 100 may include a large number (e.g., thousands or more) of UE devices 110 and wireless stations 122, as well as multiple access networks 120, core networks 130 and/or data networks 150 that connect UE devices 110 to other devices/networks in environment 100. Environment 100 may also include elements, such as gateways, monitoring devices, network elements/functions, etc. (not shown), that aid in providing data services and routing data in environment 100.

Various functions are described below as being performed by particular components in environment 100. In other implementations, various functions described as being performed by one device may be performed by another device or multiple other devices, and/or various functions described as being performed by multiple devices may be combined and performed by a single device.

Figure 2A:
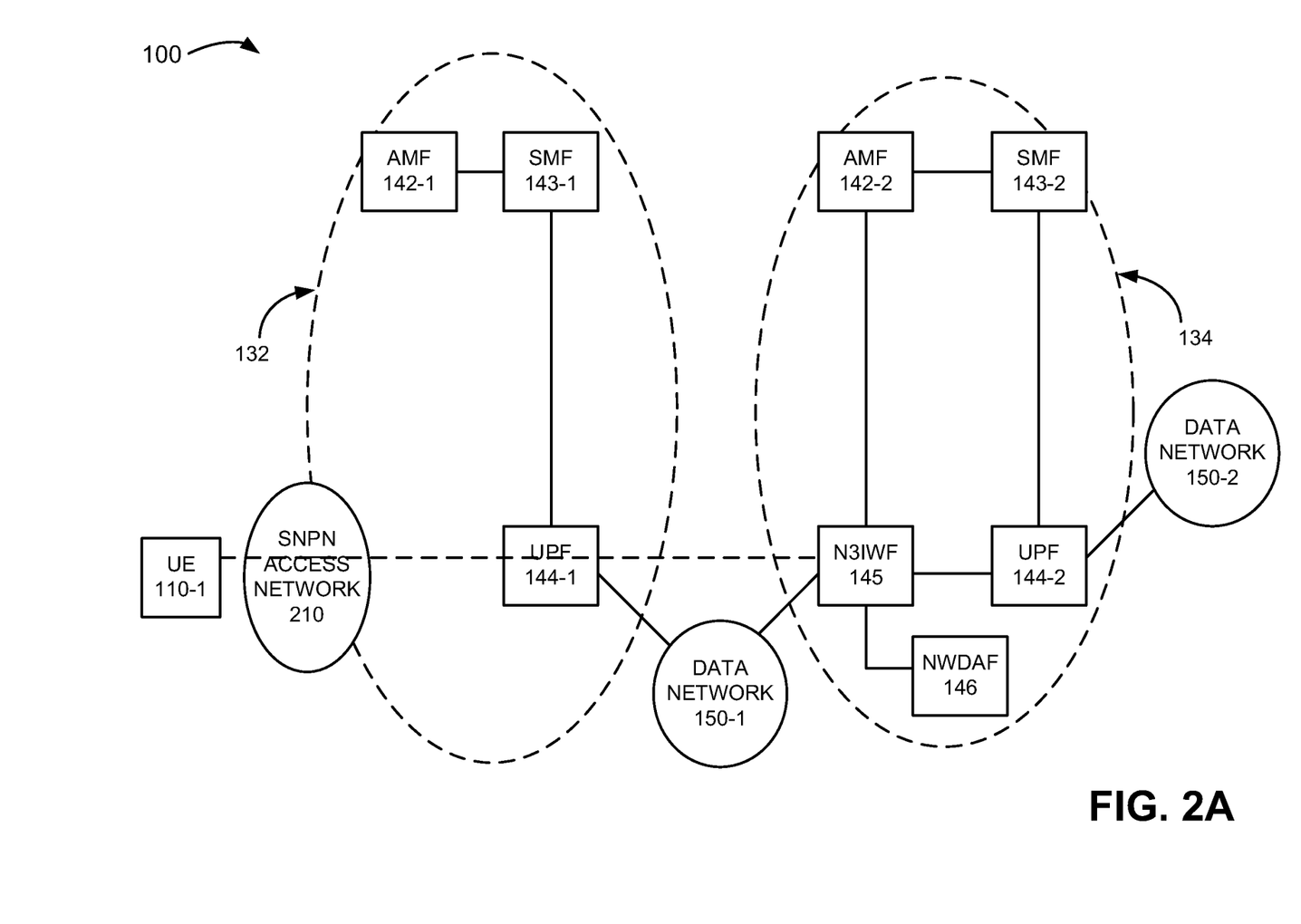
FIG. 2A is a diagram illustrating components implemented in the environment of FIG. 1 in accordance with an exemplary implementation.

FIG. 2A illustrates a portion of environment 100, including elements implemented in core network 130 or multiple core networks 130 in accordance with an exemplary implementation. Referring to FIG. 2A, environment 100 includes standalone non-public network (SNPN) 132, public land mobile network (PLMN) 134, SNPN access network 210 and data networks 150-1 and 150-2. SNPN 132 and PLMN 134 may be core networks corresponding to core network 130 illustrated in FIG. 1. In an exemplary implementation illustrated in FIG. 2A, UE 110-1 may access SNPN 132 network using, for example, a PLMN identifier (ID) and/or a network identifier (NID). SNPN 132 may include AMF 142-1, SMF 143-1 and UPF 144-1. PLMN 134 may include AMF 142-2, SMF 143-2, UPF 144-2, N3IWF 145 and NWDAF 146. It should be understood that SNPN 132 and PLMN 134 may each include other elements, including additional network functions (NFs) and/or differently arranged elements.

In an exemplary implementation, UE 110-1 may wish to access services from PLMN 134, such as voice services, video services, applications, etc., via SNPN 132. In such an implementation, assume that UE 110-1 in SNPN access mode has successfully registered with an SNPN, such as SNPN 132. UE 110-1 may perform another registration via the SNPN User Plane with a PLMN, such as PLMN 134, and may establish a connection or tunnel with PLMN 134 via SNPN access network 210. For example, UE 110-1 may establish a connection with N3IWF 145 (shown as a dashed line in FIG. 2A) and transmit messages via an NWu interface coupling UE 110-1 and N3IWF 145 though SNPN access network 210. The NWu interface may correspond to a reference point between UE 110-1 and N3IWF 145 and may be used to establish a secure tunnel (e.g., an Internet Protocol security (IPsec) tunnel) so that control plane and user plane signaling between UE 110-1 and PLMN 134 is transferred in a secure manner over untrusted SNPN access network 210.

UE device 110-1 may connect to SNPN 132 via wireless station 122 (e.g., a gNB included in SNPN access network 210, not shown in FIG. 2A). AMF 142-1 may perform registration management, connection management, reachability management, mobility management, lawful intercepts, Short Message Service (SMS) transport, transport of session management messages between UE device 110 and other network devices, such as SMF 143-1, access authentication and authorization, location services management, functionality to support non-3GPP access networks, and/or other types of management processes.

SMF 143-1 may perform session establishment, session modification, and/or session release, perform IP address allocation and management, perform Dynamic Host Configuration Protocol (DHCP) functions, perform selection and control of UPF 144-1, configure traffic steering at UPF 144-1 to guide the traffic to the correct destinations, terminate interfaces toward a policy control function (PCF) (not shown in FIG. 2A), perform lawful intercepts, charge data collection, support charging interfaces, control and coordinate of charging data collection, terminate session management parts of Non-Access Stratum (NAS) messages, perform downlink data notification, manage roaming functionality, and/or perform other types of control plane processes for managing user plane data.

UPF 144-1 may maintain an anchor point for intra/inter-RAT mobility, maintain an external Packet Data Unit (PDU) point of interconnect to a particular data network (e.g., data network 150), perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, forward an "end marker" to a RAN node (e.g., gNB/wireless station 122), and/or perform other types of user plane processes.

PLMN 134 may include AMF 142-2, SMF 143-2 and UPF 144-2. These functions/elements may perform similar functions as AMF 142-1, SMF 143-1 and UPF 144-1 described above with respect to SNPN 132. PLMN 134 may also include N3IWF 145 and NWDAF 146.

N3IWF 145 may act as a gateway for access to a core network, such as HAIN 134. For example, N3IWF 145 may provide support for N2 and N3 interface for access to other elements and/or NFs in PLMN 134. Additionally, N3IWF may provide a secure connection for the UE 110-1 accessing PLMN 134 over non-3GPP SNPN access network 210 with support for IPsec between LE 110-1 and N3IWF 145 (shown as the dashed line in FIG. 2A).

NWDAF 146 may include one or more functions and/or elements used to collect data from user equipment, network functions, operations, administration, and maintenance (OAM) systems, etc., in core networks, such as SNPN 132 and/or PLMN 134. NWDAF 146 may also collect data from other networks, such as cloud networks, edge networks, data networks 150, etc. NWDAF 146 may use the collected data to generate statistics associated with data traffic that may be used for analytics purposes. The statistics may be used for closed loop control/automation, machine learning with respect to routing data traffic, anomaly detection or for other purposes.

Environment 100 illustrated in FIG. 2A may include additional elements and/or NFs that are not illustrated. For example, core networks 132 and 134 may include a network slice selection function (NSSF), a network exposure function (NEF), a UDM, a UDR, a PCF, as well as other elements. It should also be understood that functions described as being performed by various elements in FIG. 2A, including elements in core network 130, may be performed by other elements/functions in other implementations.

Figure 2B:
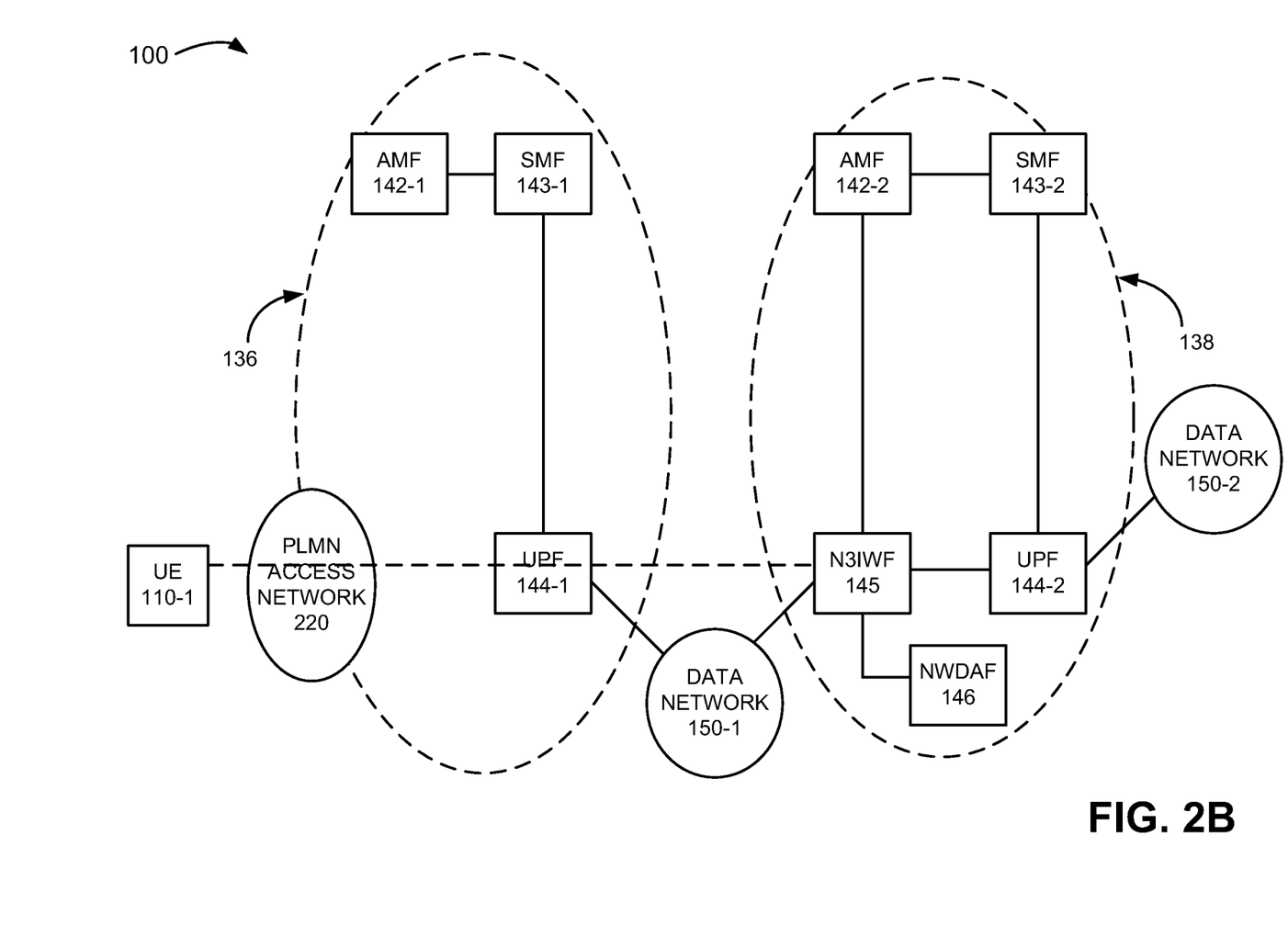
FIG. 2B is a diagram illustrating components implemented in the environment of FIG. 1 in accordance with another exemplary implementation.

FIG. 2B illustrates a portion of environment 100, including elements implemented in core network 130 or multiple core networks 130 in accordance with another exemplary implementation. Referring to FIG. 2B, environment 100 includes PLMN 136, SNPN 138, PLMN access network 220 and data networks 150-1 and 150-2. PLMN 136 and SNPN 138 may be core networks corresponding to core network 130 illustrated in FIG. 1. In the implementation illustrated in FIG. 2B, UE 110-1 may access SNPN services in SNPN 138 via PLMN 136. PLMN 136 may include AMF 142-1, SMF 143-1 and UPF 144-1. SNPN 138 may include AMF 142-2, SMF 143-2, UPF 144-2, N3IWF 145 and NWDAF 146. It should be understood that PLMN 136 and SNPN 138 may each include other elements and/or differently arranged elements. The functions performed by elements in PLMN 136 and SNPN 138, such as AMF 142, SMF 143, UPF 144, N3IWF 145 and NWDAF 146 may be similar to those functions performed by the corresponding elements discussed above with respect to FIG. 2A.

In an exemplary implementation, UE 110-1 may wish to access services, such as voice, video, applications, etc., from SNPN 138 via PLMN 136. In such an implementation, UE 110-1 may establish a connection or tunnel with SNPN 138 via PLMN access network 220, illustrated as the dashed line in FIG. 2B. NWDAF 146 may then monitor actions performed by N3IWF 145, as described in detail below.

Environment 100 illustrated in FIG. 2B may include additional elements and/or NFs that are not illustrated. For example, core networks 136 and 138 may include an NSSF, an NEF, a UDM, a UDR, a PCF, as well as other elements. It should also be understood that functions described as being performed by various elements in FIG. 2B, including elements in core network 130, may be performed by other elements/functions in other implementations.

Figure 3:
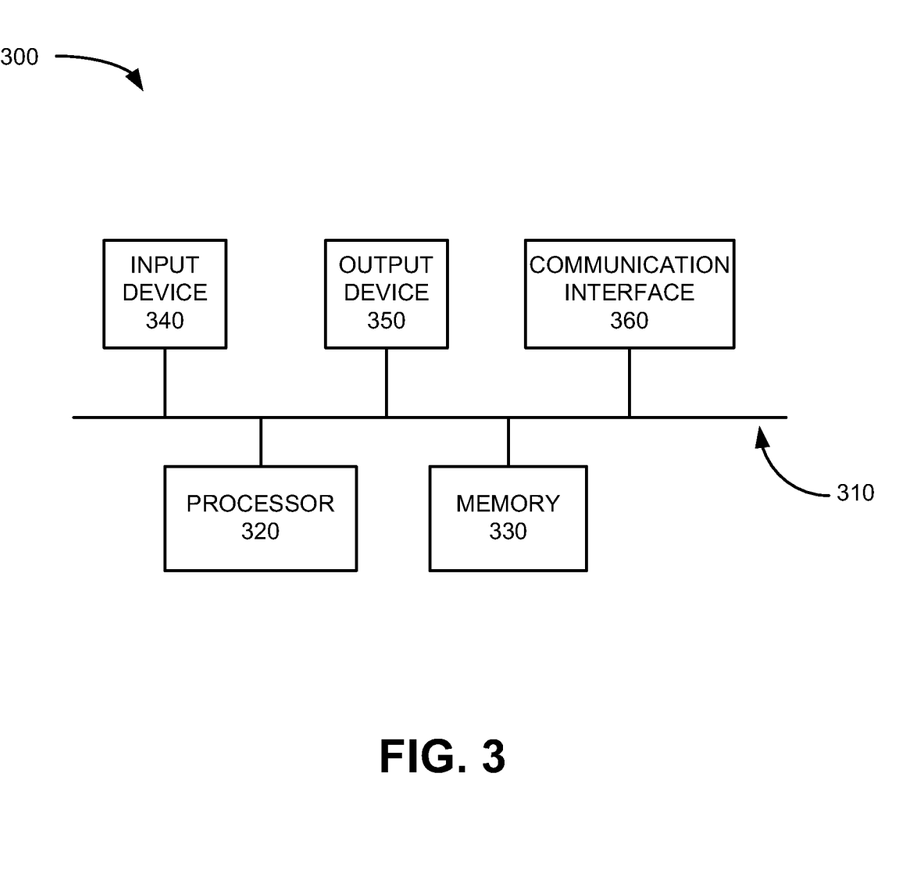
FIG. 3 is a block diagram of logic components implemented in one or more of the elements or components illustrated in FIGS. 1, 2A and/or 2B in accordance with an exemplary implementation.

FIG. 3 illustrates an exemplary configuration of a device 300. One or more devices 300 may correspond to or be included in devices in environment 100, such as UE device 110, wireless station 122, network devices 140, such as AMF 142, SMF 143, UPF 144, N3IWF 145, NWDAF 146 and other devices included in environment 100. Referring to FIG. 3, device 300 may include bus 310, processor 320, memory 330, input device 340, output device 350 and communication interface 360. The exemplary configuration illustrated in FIG. 3 is provided for simplicity. It should be understood that device 300 may include more or fewer components than illustrated in FIG. 3.

Bus 310 may connect the elements illustrated in FIG. 3. Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SSD). Memory 330 may also include a magnetic and/or optical recording medium (e.g., a hard disk) and its corresponding drive.

Input device 340 may include a mechanism that permits a user to input information, such as a keypad, a keyboard, a mouse, a pen, a microphone, a touch screen, voice recognition and/or biometric mechanisms, etc. Output device 350 may include a mechanism that outputs information to the user, including a display (e.g., a liquid crystal display (LCD)), a speaker, etc. In some implementations, device 300 may include a touch screen display may act as both an input device 240 and an output device 350.

Communication interface 360 may include one or more transceivers that device 300 uses to communicate with other devices via wired, wireless or optical mechanisms. For example, communication interface 360 may include one or more radio frequency (RF) transmitters, receivers and/or transceivers and one or more antennas for transmitting and receiving RF data. Communication interface 360 may also include a modem or an Ethernet interface to a LAN or other mechanisms for communicating with elements in a network.

In an exemplary implementation, device 300 performs operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), solid state drive (SSD), etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Figure 4:
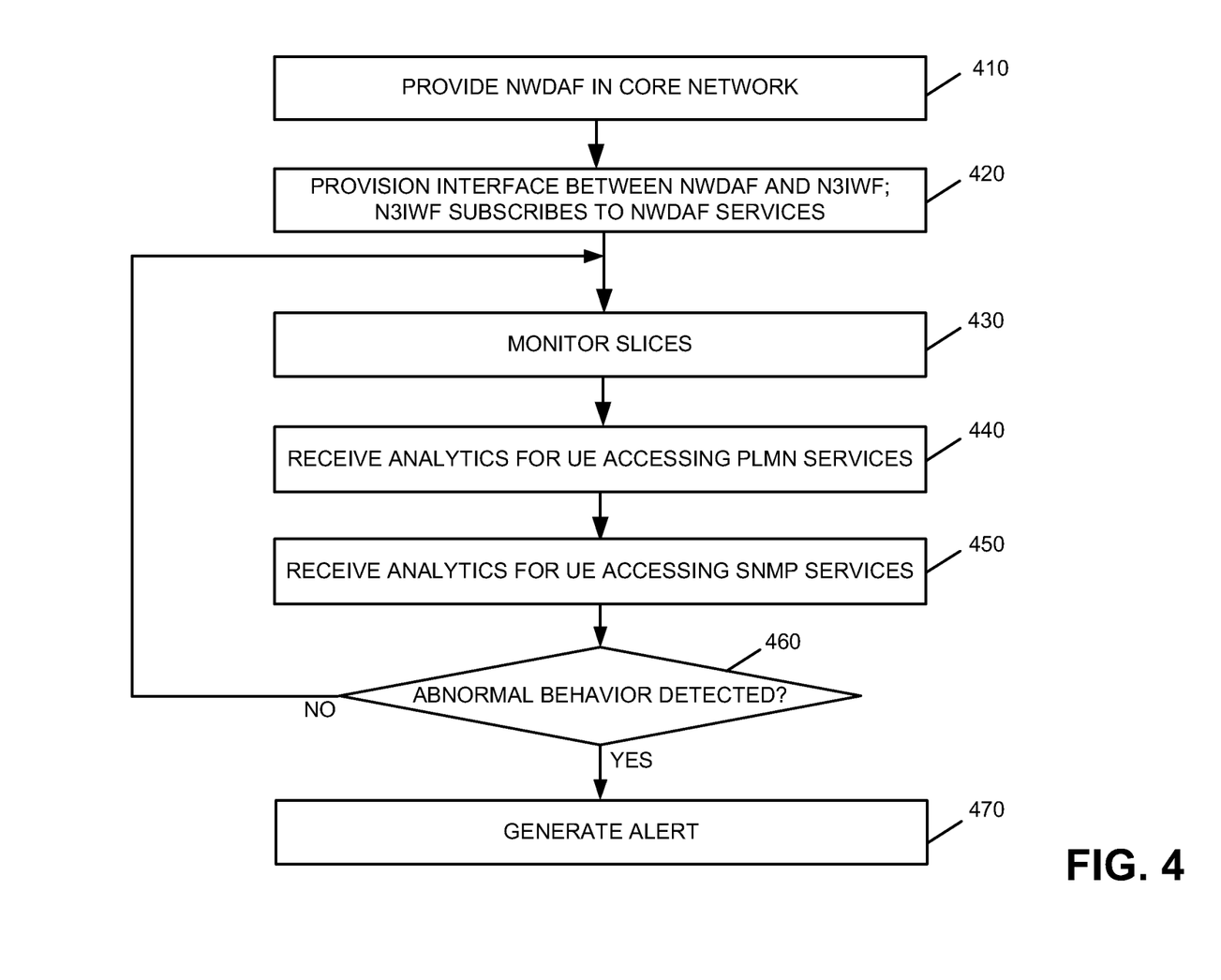
FIG. 4 is a flow diagram illustrating processing associated with obtaining N3IWF-related data in accordance with an exemplary implementation.

FIG. 4 is a flow diagram illustrating processing associated with N3IWF 145 subscribing to NWDAF services in accordance with an exemplary implementation. Processing may begin by provisioning NWDAF 146 in environment 100 (block 410). For example, a service provider associated with core network 130 may provide NWDAF 146 in PLMN 134, as illustrated in FIG. 2A. In another implementation, the service provider may provide NWDAF 146 in SNPN 138, as illustrated in FIG. 2B. In either case, NWDAF 146 may provide network data analytics services associated with various NFs in environment 100, including N3IWF 145.

For example, NWDAF 146 may allow NFs, such as AMF 142 and SMF 143 and other NFs (e.g., a PCF, NSSF, NEF, UDM) to subscribe to NWDAF services. In an exemplary implementation, NWDAF 146 may also allow N3IWF 145 to subscribe to NWDAF-related services. For example, NWDAF 146 may provide one or more interfaces to support the transfer of traffic or other data associated with functions performed by N3IWF 145 in environment 100 to/from NWDAF 146 (block 420). The interface may allow N3IWF 145 to subscribe to and unsubscribe from various analytic events generated by NWDAF 146. The interface may also allow N3IWF 145 to request information from NWDAF 146 and receive notifications from NWDAF 146 regarding observed events. In some implementations, the notifications may be provided to N3IWF 145 automatically on a periodic basis and/or provided in response to events detected by NWDAF 146, such as a data event exceeding a threshold value.

Assume that N3IWF 145 subscribes to analytics services, notification services and request services provided via NWDAF 146 (block 420). For example, NWDAF 146 may provide an interface and/or reference point for access by N3IWF 145 and receive communications from N3IWF 145 via the interface/reference point. For example, NWDAF 146 may receive communications, such as Nnwdaf_Analytics-Subscription_Subscribe, Nnwdaf_Analytics_Subscription_Notify and Nnwdaf_AnalyticsInfo_Request, from N3IWF 145 via the interface/reference point to NWDAF 146. These messages or calls via the interface to NWDAF 146 indicate that N3IWF 145 is subscribed to NWDAF 146 for providing data to NWDAF 146, receiving notifications from NWDAF 146 and providing requests for analytics information to NWDAF 146.

NWDAF 146 may then obtain and/or monitor data traffic associated with N3IWF 145 operating in environment 100 (e.g., in PLMN 134 in FIG. 2A or SNPN 138 in FIG. 2B). In an exemplary implementations, NWDAF 146 may monitor data obtained from N3IWF 145 on a per slice basis (block 430). For example, based on network slice information identified by NSSAI, S-NSSAI, or other information, NWDAF 146 may obtain data from N3IWF 145 (and other NFs) associated with network slices supported in environment 100 to ensure that the network slices are meeting their respective QoS requirements, SLA requirements or other KPIs associated with the respective slices.

As an example, NWDAF 146 may receive data/traffic related information from N3IWF 145 regarding actions performed by N3IWF 145 for UE devices 110 accessing PLMN services from PLMN 134 via SNPN 132, as illustrated in FIG. 2A (block 440). NWDAF 146 may also receive data/traffic related information from N3IWF 145 regarding actions performed by N3IWF 145 for UE devices 110 accessing SNPN services from SNPN 138 via PLMN 136, as illustrated in FIG. 2B (block 450). In each case, NWDAF 146 may analyze the obtained data to ensure that the slice associated with UE 110-1 is meeting its requirements (e.g., QoS, SLA, KPIs, etc.).

NWDAF 146 may also monitor the data received from N3IWF 145 to determine if abnormal behavior is detected (block 460). Abnormal behavior may include any behavior in which a particular measured or analyzed data traffic statistic, parameter, KPI, etc., is outside an accepted range, threshold or value. For example, NWDAF 146 may analyze voice call records and determine that voice calls at a particular location are not being completed at an appropriate rate. In this case, NWDAF 146 may detect abnormal behavior at that particular location (block 460—yes). NWDAF 146 may also generate an alert or message and send the alert/message to the appropriate devices in environment 100 and/or personnel associated with monitoring environment 100 (block 470). In other instances, NWDAF 146 may determine that in response to detecting abnormal behaviors, traffic should be routed in a different manner to avoid congestion and better serve users.

For example, if a large number of UE devices 110 are located in a sports stadium and accessing PLMN or SNPN services at the same time, NWDAF 146 may determine that data traffic from at least some of the UE devices 110 should be routed to a WiFi interface or private network interface provided in the sports stadium based on the location of the particular UE devices 110. This may allow the service provider to better serve users on a real time basis based on information obtained from N3IWF 145 by NWDAF 146. In other implementations, a large number of UE devices 110 in a manufacturing facility, retail area (e.g., a mall), public area, medical facility, warehouse, financial facility or any other area may be simultaneously accessing PLMN or SNPN services via N3IWF 145. In these cases, NWDAF 146 may determine that data traffic should be routed to a particular network/interface (e.g., a WiFi interface or private network interface) located in relatively close proximity to the UE devices 110 to better serve users on a real time basis.

Referring back to block 460, if abnormal behavior is not detected (block 460-no), NWDAF 146 may continue to monitor and analyze data obtained from N3IWF 145. This may allow a service provider to better serve users accessing various data services.

In each case, NWDAF 146 may obtain data and/or events from N3IWF 145 based on a subscription to NWDAF 146. In addition, in some implementations, NWDAF 146 may include logic to determine when to collect data and/or events from N3IWF 145. For example, for low latency slices and/or time sensitive slices, NWDAF 146 may obtain data and/or events more frequently (or on a continuous basis) than for a slice that is less time sensitive.

Implementations described herein provide an NWDAF to obtain traffic information, event-related information and other information from an N3IWF. This may allow a service provider to easily obtain data without having to use a network engineer or technician to obtain the data. This may also allow a service provider to ensure that a network slice is meeting QoS, SLA or other KPIs associated with the particular slice, and also to identify abnormal behavior in a network.

The foregoing description of example implementations provides illustration and description, but is not intended to be exhaustive or to limit the embodiments to the precise form disclosed. Modifications and variations are possible in light of the above teachings or may be acquired from practice of the embodiments.

For example, features have been described above with respect to accessing PLMN and SNMP services. It should be understood that implementations described herein may be used in any core network in which an N3IWF and NWDAF are deployed. For example, implementations described herein may be used to support an NWDAF obtaining data from an N3IWF deployed in any private or public network.

Further, while series of acts have been described with respect to FIG. 4, the order of the acts may be different in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
providing a network data analytics function (NWDAF) in a network, wherein providing the NWDAF comprises:
providing at least one of an interface or reference point to the NWDAF to support access by a non-third generation partnership project (3GPP) interworking function (N3IWF);
providing, the (N3IWF) in the network;
subscribing, by the N3IWF, to the NWDAF;
obtaining, by the N3IWF, data associated with processing performed by the N3IWF for a first one of a plurality of network slices; and
providing, via the interface or reference point, the obtained data to the NWDAF.

2. The method of claim 1, further comprising:
receiving, by the N3IWF and via a standalone non-public network (SNPN), a communication from a user device accessing services from a public land mobile network (PLMN).

3. The method of claim 2, further comprising:
obtaining, by the NWDAF and via the N3IWF, information associated with accessing services from the PLMN.

4. The method of claim 1, further comprising:
receiving, by the N3IWF and via a PLMN, a communication from a user device accessing services from an SNPN.

5. The method of claim 4, further comprising:
obtaining, by the NWDAF and via the N3IWF, information associated with accessing services from the SNPN.

6. The method of claim 1, further comprising:
monitoring, by the NWDAF using information obtained from the N3IWF, information associated with a user device accessing SNPN services via a PLMN or a user device accessing PLMN services via an SNPN.

7. The method of claim 1, further comprising:
analyzing, by the NWDAF, the obtained data to identify abnormal behavior.

8. The method of claim 1, further comprising:
monitoring, by the NWDAF, data associated with processing performed by the N3IWF on a per slice basis.

9. The method of claim 1, wherein the subscribing to the NWDAF further comprises:
subscribing to at least one of analytics services, notification services or request services provided via the NWDAF.

10. A system, comprising:
a network data analytics function (NWDAF) deployed in a network, wherein the NWDAF includes an interface or reference point to support access by a non-third generation partnership project (3GPP) interworking function (N3IWF); and the N3IWF deployed in the network, wherein the N3IWF is configured to:
subscribe to the NWDAF,
obtain data associated with processing performed by the N3IWF for a first one of a plurality of network slices supported in the network, and
provide, via the interface or reference point, the obtained data to the NWDAF.

11. The system of claim 10, wherein the N3IWF is further configured to:
receive, via a standalone non-public network (SNPN), a communication from a user device accessing services from a public land mobile network (PLMN).

12. The system of claim 11, wherein the NWDAF is further configured to:
obtain, via the N3IWF, information associated with the user device accessing services from the PLMN.

13. The system of claim 10, wherein the N3IWF is further configured to:
receive, via a PLMN, a communication from a user device accessing services from an SNPN.

14. The system of claim 13, wherein the NWDAF is further configured to:
obtain, via the N3IWF, information associated with the user device accessing services from the SNPN.

15. The system of claim 10, wherein the NWDAF is further configured to:
monitor information associated with a user device accessing SNPN services via a PLMN or a user device accessing PLMN services via an SNPN.

16. The system of claim 10, wherein the NWDAF is further configured to:
analyze data received from the N3IWF to identify abnormal behavior.

17. The system of claim 10, wherein the NWDAF is further configured to:
monitor data associated with processing performed by the N3IWF on a per slice basis.

18. The system of claim 10, wherein when subscribing to the NWDAF, the N3IWF is configured to:
subscribe to at least one of analytics services, notification services or request services provided via the NWDAF.

19. A non-transitory computer-readable medium having stored thereon sequences of instructions which, when executed by at least one processor associated with a non-third generation partnership project (3GPP) interworking function (N3IWF) deployed in a network, cause the at least one processor to:
subscribe to a network data analytics function (NWDAF) deployed in the network, wherein the NWDAF includes an interface or reference point to support access by the N3IWF;
obtain data associated with processing performed by the N3IWF for a first one of a plurality of network slices supported in the network; and
provide the obtained data to the NWDAF via the interface or reference point.

20. The non-transitory computer-readable medium of claim 19, wherein when subscribing to the NWDAF, the instructions cause the at least one processor to:
subscribe to at least one of analytics services, notification services or request services provided via the NWDAF.

* * * * *